E. & E. E. MUELLER.
HINGE JOINT FOR ARTIFICIAL LIMBS AND OTHER PURPOSES.
APPLICATION FILED DEC. 7, 1910.
1,008,048.
Patented Nov. 7, 1911.
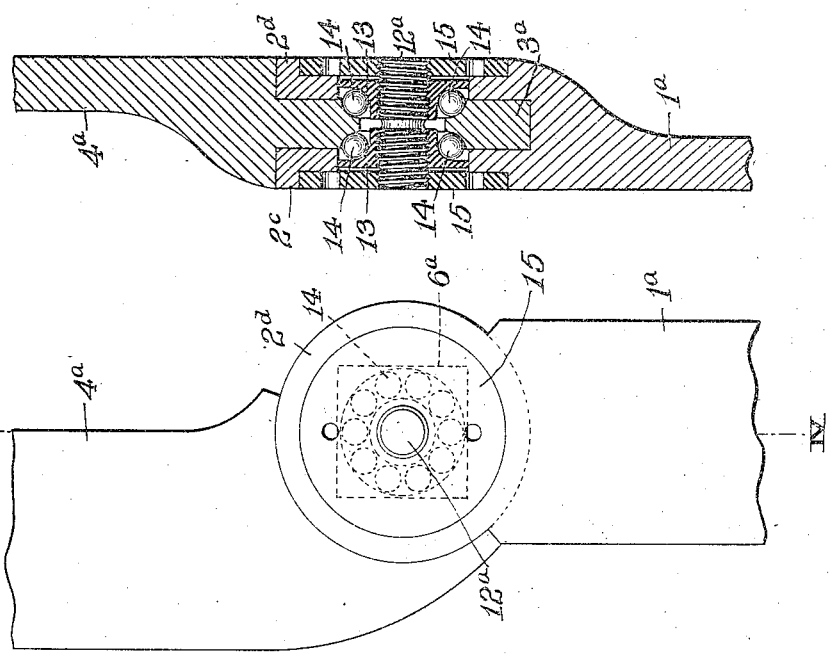
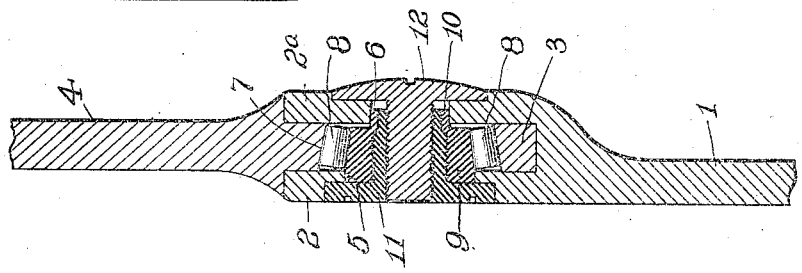
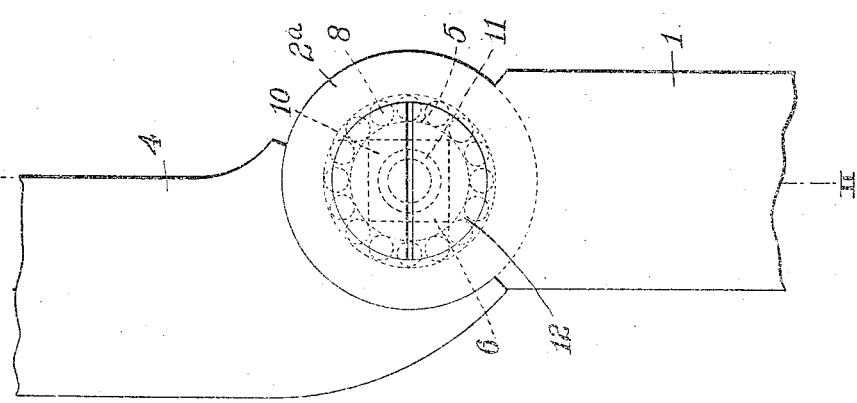

UNITED STATES PATENT OFFICE.

ENGELBERT MUELLER AND EUGENE E. MUELLER, OF PITTSBURGH, PENNSYLVANIA.

HINGE-JOINT FOR ARTIFICIAL LIMBS AND OTHER PURPOSES.

1,008,048.  Specification of Letters Patent.  Patented Nov. 7, 1911.

Application filed December 7, 1910. Serial No. 596,076.

*To all whom it may concern:*

Be it known that I, ENGELBERT MUELLER and EUGENE E. MUELLER, residing at Pittsburgh, in the county of Allegheny and State of Pennsylvania, citizens of the United States, have invented or discovered certain new and useful Improvements in Hinge-Joints for Artificial Limbs and other Purposes, of which improvements the following is a specification.

Our invention relates to the construction of hinge-joints that are provided with bearing elements and used particularly in artificial limbs.

As is well known, joints of this character, being subject to considerable use, rapidly wear away in their bearing and contact parts and become loose. The looseness thus caused is of a double nature, that is, the bearing parts wear in such a way that there is a longitudinal play between the two connected pieces, and a lateral play whereby the connected pieces get out of line.

The object of this invention is to provide a joint with direct bearing elements that will have adjustments to compensate for both the longitudinal and lateral wearing of the bearing parts.

A further object of this invention is to provide both of these adjustments in such a way that the operation of the joint will not be effective to alter or destroy its adjustment.

Our invention is illustrated in the accompanying drawing in which—

Figure 1 is an elevation of our preferred form of joint; Fig. 2 a sectional view taken on the line II—II of Fig. 1; Fig. 3 an elevation of an alternate construction; and Fig. 4 a sectional view taken on the line IV—IV of Fig. 3.

Like numerals are used to designate like parts in the several figures.

Referring to Figs. 1 and 2, the member 1 terminates in two lugs 2 and 2ª, which have disposed between them a lug 3, which forms the termination of the second member 4. We do not wish to limit ourselves to any particular form of lugs and connecting members, for their form may be changed and the object of our invention be attained. As herein shown the lug 2 has a circular hole 5, and the lug 2ª has a square hole 6, both of which holes are smooth and centered upon an axis that is normal to the line of direction of the members 1 and 4. The lug 3 of the member 4 has a conically shaped hole 7, so placed that, when the parts are assembled, its center will be upon the same axis as that upon which the centers of the holes 5 and 6 lie. A set of bearing elements 8, which in this construction are rollers preferably in the form of frusta of cones, is placed to bear externally against the conical surface of the lug 3 and internally against an internally-threaded sleeve-nut 9, which also has an external conically shaped bearing surface. The said sleeve-nut is provided with a square shaped portion 10 preferably on its narrower end, which portion fits into the hole 6 and thereby causes the sleeve-nut to rotate with the member 1. A second sleeve-nut 11, which is screw-threaded both internally and externally, is screwed within the sleeve-nut 9. From the other side of the joint a screw 12 is inserted to hold the sleeve-nut in proper contact with the rollers. When the parts are disposed as is particularly shown in Fig. 2, and it is desired to take up some longitudinal play caused by wear, or when it is desired to have the joint operate less freely, the sleeve-nut 11 is unscrewed a small amount, dependent upon how much tightening is to be done, and the screw 12 is tightened to bring the parts securely into place again. In this operation it will be observed that, by unscrewing the sleeve-nut 11, the sleeve-nut 9 is advanced upon the shaft of the first named sleeve-nut, and that, by tightening the screw 12, the sleeve-nut 9 is moved toward the lug 2ª, and thereby the space within which the rollers are disposed is diminished. It will be apparent that, by properly decreasing this roller space, any undesirable longitudinal play may be taken up. Furthermore, in case the wear had been upon the inside surfaces of the lugs 2 and 2ª and the outside surfaces of the lug 3, which surfaces are hereinafter termed "contact-surfaces", so that a certain amount of lateral play was caused, the same could be taken up by first slightly unscrewing the screw 12, (the sleeve-nut 11 being held firmly from rotation) and then screwing in the sleeve-nut 11 while the screw 12 is held from rotation. A further tightening of both the sleeve-nut and screw will bend the lugs 2 and 2ª into engagement with the lug 3 and thereby take up all the loose lateral play without changing the roller-bearing space. It will be observed that, in the operation of the joint, the sleeve-nuts 9 and 11 and the screw 12 all move with the lugs 2 and 2ª, so that there is no frictional engagement which might cause the threaded parts to loosen or tighten. Furthermore the construction provides adjustments to compensate both for a longitudinal and for a lateral wear.

In Figs. 3 and 4 we have shown an alternate construction of our invention, wherein two sets of bearing elements are used in place of the one set of the other construction, and in this case the bearing elements are ball-bearings. In this construction both the lugs 2ᶜ and 2ᵈ are provided with square holes 6ª, into which the screw-threaded bearing blocks 13 fit. The lug 2ª is provided with a circular hole, grooved on each side as shown, to receive and provide bearing for the balls 14. A screw 12ª, provided throughout half its extent with right handed threads and throughout the other half with left-handed threads, is disposed within the bearing blocks 13. A nut 15 is screwed on each end of the screw 12ª to engage the lugs 2ᶜ and 2ᵈ to the end that a lateral play may be taken up by screwing the said nuts upon the said screw. The lateral play being taken up as described, it will readily be seen that any longitudinal play or looseness may be overcome by turning the screw 12ª so as to bring the bearing blocks 13 nearer together. Furthermore, in this construction, the parts are so arranged that the operation of the joint will not cause any frictional tendency to alter its adjustment.

While we have shown and described two constructions wherein our invention is accomplished, we do not wish to limit ourselves to these constructions or to the details of construction herein shown and described for, obviously, changes may be made by those skilled in the art without departing from the spirit of our invention.

It will be understood that the term "bearing surfaces" used in the claims is descriptive of the surfaces between which the bearing elements are disposed, and that the "contact-surfaces" are the adjacent lateral faces of the lugs as is hereinbefore stated.

We claim as our invention:

1. In a bearing-element hinge-joint for artificial limbs and other purposes, the combination of two connecting members provided with contact surfaces and bearing surfaces, means for adjusting the relation of said contact surfaces, independent means for adjusting the relation of said bearing surface, both of said adjusting means arranged so as not to be affected by the operation of the joint, substantially as described.

2. A joint for artificial limbs and other purposes connecting a member terminating with two lugs to a second member terminating with a single lug disposed between the two lugs of the first named member, said several lugs being provided with apertures, a connecting plug disposed within said apertures, bearing elements disposed around and adjacent said plug and within said aperture, substantially as described.

3. In a hinge-joint for artificial limbs and other purposes, the combination of a tongue, a two-lugged member, a connecting pin, and bearing elements included in an annular space formed by and between the said pin and the inner face of said tongue, the width of said annular space being adjustable, substantially as described.

4. In a hinge-joint for artificial limbs and other purposes, the combination of a two-lugged member, a tongue, and a connecting pin, the oppositely disposed surfaces of said pin and tongue forming an annular space with a limiting wall oblique to the horizontal, and bearing elements disposed within said annular space, substantially as described.

5. In a hinge-joint for artificial limbs and other purposes, the combination of a two-lugged member, a tongue member, a sleeve-nut with a conical external surface disposed within the apertures of said two-lugged member and tongue, and fixed to rotate with said two-lugged member, an annular space around said sleeve-nut provided with a series of rollers, a second sleeve-nut within said first named sleeve-nut, and a screw within said second named sleeve-nut, substantially as described.

In testimony whereof we have hereunto set our hands.

ENGELBERT MUELLER.
EUGENE E. MUELLER.

Witnesses:
G. G. TRILL,
PAUL N. CRITCHLOW.